United States Patent [19]

Hamilton

[11] 3,829,231

[45] Aug. 13, 1974

[54] TOOL FOR GRIPPING AND PERFORMING WORK OPERATIONS ON BUILDING MATERIALS AND THE LIKE

[76] Inventor: Thomas Hamilton, 4619 Northern Pk., Monroeville, Pa. 15146

[22] Filed: Aug. 4, 1972

[21] Appl. No.: 278,182

[52] U.S. Cl. ............... 408/108, 408/115, 83/745, 269/2
[51] Int. Cl. ..................... B23b 47/28, B26d 1/10
[58] Field of Search ............ 83/743, 745; 269/1, 2; 408/108, 103, 109, 115

[56] References Cited
UNITED STATES PATENTS
2,708,465   5/1955   Huebner et al. ............... 83/745
3,389,724   6/1968   Paul ............................. 269/1 X Primary Examiner—Gil Weidenfeld

[57] ABSTRACT

A tool consists of a mounting member having adjustable grips which attach to the construction material and a carriage having a working tool is then movable relatively to the clamped construction material to perform work operations at selected locations. The clamps are adjustable within a bar or channel and once adjusted to the correct position within the channel and further adjusted relatively to the size of the construction material, the clamps are fixed in place and the channel is held fast. The carriage having a tool such as a drill, cutting blade, rip saw, etc. mounted on the carriage is then caused to slide back and forth on the channel to make selected working operations at given locations and the construction material can be plywood, studs, sheet goods and the like.

7 Claims, 5 Drawing Figures

TOOL FOR GRIPPING AND PERFORMING WORK OPERATIONS ON BUILDING MATERIALS AND THE LIKE

BACKGROUND OF THE INVENTION

There have been proposed many different devices for cutting articles such as linoleum, cardboard, plywood, and the like but for the most part these tools lack the ability to perform a great number of functions which are encountered at "on-site" construction where a great variety of materials must be cut including but not limited to studs, plywood, roofing material and the like. What is needed, is a tool which is capable of performing work operations at precise locations on building material, such different work operations including but not limited to cutting, drilling, sawing, etc., and to perform such functions in a precise manner and with considerable ease and speed.

Also, during on-site construction it frequently happens that a number of studs, or panels must all be cut to a uniform size and contain drilled openings at uniformly spaced locations. What is needed, is a tool which can, with a single setting, perform these multiple functions so that it would be possible to obtain uniformity and speed in order to reduce the costs of construction which are rising at substantial rates.

Another important consideration in the background of the present invention is that there is considerable interest now being shown on the part of amateur builders who want to perform their own building operations but who lack the degree of skill to do an adequate job. It is with this group of inexperienced people that the present invention is also valuable because the present invention makes it possible to accurately locate a tool relatively to the construction material and perform the necessary operations so that as a result, the finished product has an excellent appearance and is accurately formed.

OBJECTS OF THE INVENTION

It is a principal object of the present invention to provide a tool which is capable of performing cutting, drilling, or scoring operations and the like on construction materials in an easy and convenient manner so that such operations are accurately and rapidly performed.

Another object of the present invention is to provide a rugged construction type tool which can be operated at on-site locations and which is capable of performing multiple working operations on assembled construction articles such as a number of clamped studs.

A further object of the present invention is to provide a tool which can easily and conveniently clamp in place a number of construction material articles which can then be simultaneously worked upon to provide accurate and precise operations such as cutting, drilling and the like.

Other objects and features of the present invention will become apparent from a consideration of the following description which proceeds with reference to the accompanying drawings.

DRAWINGS

FIG. 1 is an isometric detail view illustrating the tool of the present invention;

FIGS. 2, 3 and 4 are enlarged sectional detail views taken on lines 2—2, 3—3 and 4—4 of FIG. 1; and, FIG. 5 illustrates in detail view the carriage construction with different attachments whereby various tools can be added to the carriage.

DETAILED DESCRIPTION OF THE INVENTION

Figure 1:
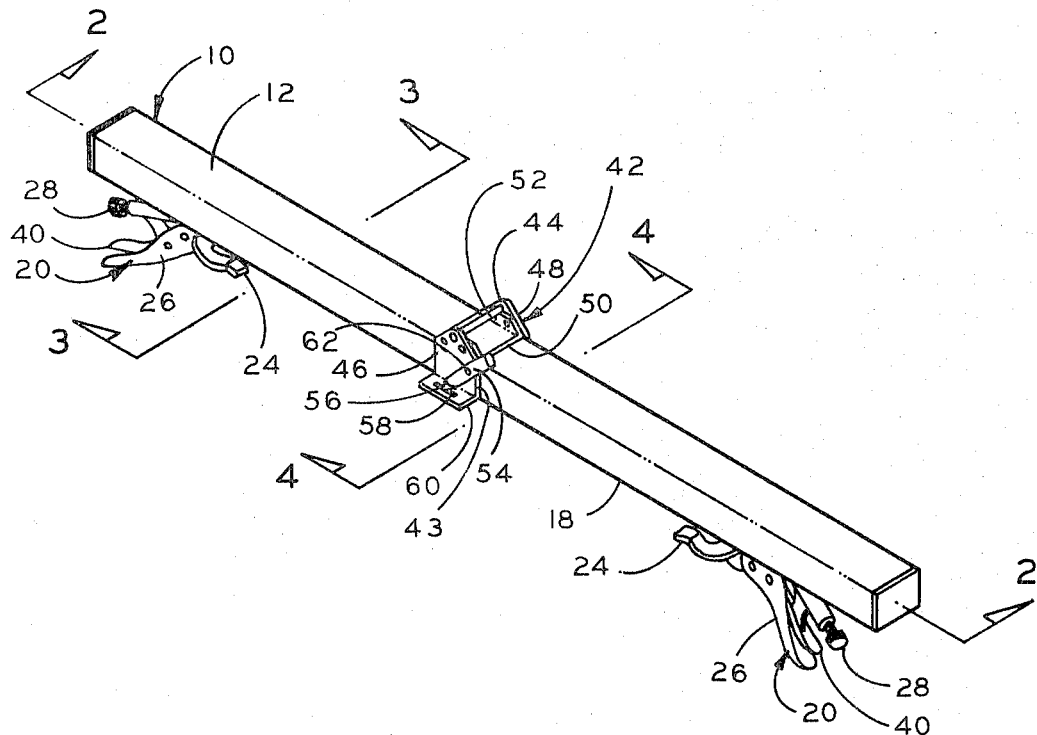
Figure 2:
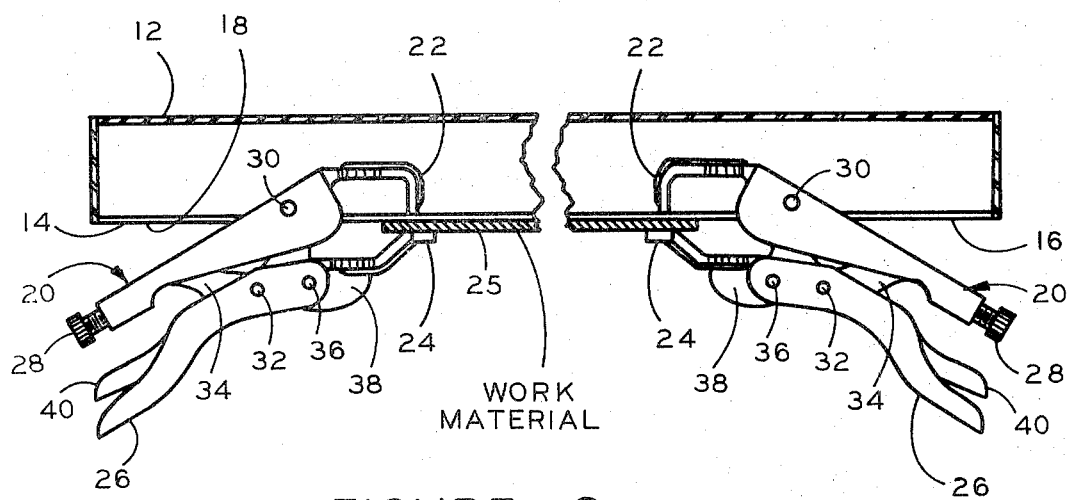
Figure 3:
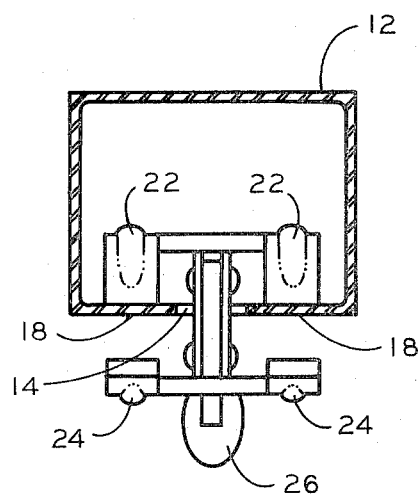
Figure 4:
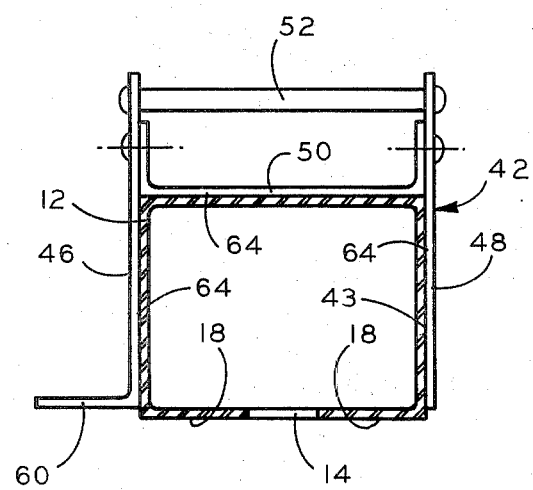

Referring now to FIG. 1 there is shown a tool designated generally by reference numeral 10 and consisting of a channel or elongate member 12, with slots 14 and 16, at the undersurface 18 of the channel. Within each slot is a movable clamp 20, the two clamps being identically constructed. The detailed construction features of the clamps do not constitute a part of the present invention but details of the operation and construction can be obtained from U.S. Pat. Nos. 2,280,005 and 2,514,130. The clamps each include two sets of jaws 22 and 24, the one set of jaws 22 being located within the channel and gripping the interior surface of the channel and the second set of jaws 24 being forcible toward the undersurface of the channel by handle 26. The material being worked upon 25 is clamped between jaws 24 and the undersurface 18 of the channel 12. The jaws 24 are adjustable to different size or widths of work material by means of an adjusting screw 28 which adjustably pivots the jaws 24 about a pivot pin 30 until the correct dimension is obtained of the clearance of the jaws 24 from the undersurface 18 of the channel. The clamping is then obtained by means of clamping handle 26 which is pivotally connected at 32, with toggle link 34 and at 36 with jaw lever 38.

Once the clamping is effected, the tool and work material are held firmly together until a release lever 40 which is carried by the clamping lever or handle 26 is actuated. Because the two laterally adjustable tools can be readily moved on the channel 12, they can easily be clamped to the construction material regardless of the dimensions of the construction material assuming, of course, that the channel 12 is long enough and the two clamps 20 can be moved relatively far enough apart or close together within the dimensional limitations of the plywood or other construction material.

After the clamps are moved laterally by the correct amount to accomodate for the size of the construction material, the clamping is then effected by rotating the handles 26 in such direction that the construction material 25 is clamped between the external jaws 24 of the clamps and the undersurface 18 of the channel.

Once the tool and construction materials are locked together, one relatively to the other, the various operations such as drilling, cutting, etc., can then be performed on the construction material. Actual work on the construction material is performed by means of a carriage 42 and tool 44 mounted thereon. The carriage 42 consists of a way 43 formed by two upright flanges 46 and 48 with a cross member 50. A handle 52 provides the gripping means whereby the carriage 42 can be manually moved back and forth. On flange 46 is a pivotally mounted handle 54 having a knife 56 which projects through a slot 58 in side flange 60 so that, depending upon the position of the channel relatively to the work piece, a straight line cut will be effected when the carriage 42 is moved and the handle 54 is forced upwardly about pivot 62 causing blade to cut the straight and continuous line. The inner surfaces 64 of the way 43 are suitably coated with a low friction material such as Teflon or the like to facilitate back and forth movement of the carriage 42. It should be noted that the channel 12 can be adjusted at any preferred orientation relatively to the work material 25 to perform the cutting operation at the selected location and the important advantage of the present invention is that once the channel 12 is properly located and the work material 25 clamped in place, the cutting is performed smoothly and without deviation at the selected location.

Figure 5:
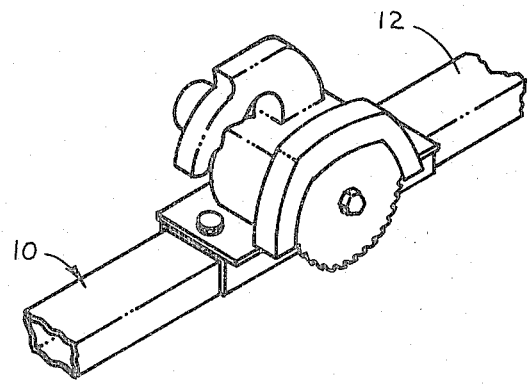

Not only can the carriage 42 be adapted for mounting a blade but other tools can be mounted thereon as well. The flange 60 of the carriage 42 can be adapted for mounting many other tools as for example cutting tool having a cutting wheel 70 (FIG. 5) as opposed to a cutting blade, a power saw, a drill, or other tool. Also, the side flange 70 can be provided with openings (not shown) to serve as templates for drilling operations as well.

OPERATION

In operation, the channel 12 is clamped in place at a preferred bias or attitude and location relatively to the work piece 25 and clamps 20 are then operated so that the outer jaws 24 will clamp the work piece 25 in place at the undersurface 18 of the channel 12.

The work product consists, for example, of a pile of studs, plywood or the like.

After the tool is placed, the cutting operation is performed by moving the carriage 42 across the work piece 25 while pressing upwardly on the handle 54 and bringing the cutting edge of the blade 56 which extends through the slot 58 on the flange 60 against the plywood and causing the cutting to occur as the carriage 42 is moved.

After the work is performed the clamps are loosened and the tool is moved to a new location or clamped onto a new set of work pieces. The side of the channel is used as a locating means for tool operation. For example, after the channel is clamped in place the work pieces can be cut by a saw in which the side edges of the channel are used as a guide or template for the blade of the saw.

Although the present invention has been illustrated and described in connection with a single example embodiment it will be understood that this is illustrative of the invention and is by no means restrictive thereof. It is reasonably to be expected that those skilled in this art can make numerous revisions and adaptations of the invention and it is intended that such revisions and adaptations will be included within the scope of the following claims as equivalents of the invention.

What I claim is:

1. A device for clamping a work piece and performing a work operation thereon comprising an elongate member, at least two gripping means slidably supported on said elongate member for movement in the longitudinal direction thereof, each of said gripping means being selectively positionable along said elongate member to hold work pieces of various lengths and being selectively adjustable to clamp work pieces of various thicknesses to the elongate member, said gripping means being actuable between clamping and non-clamping positions, each of said gripping means including adjustment means operative in the non-clamping position to cause said gripping means, when actuated into the clamping position, to adjust itself to accommodate a work piece of predetermined thickness, carriage means slidably carried on said elongate member, and tool means supported by said carriage means for effecting a work operation on the work piece.

2. The tool in accordance with claim 1 including a cutting member operatively carried by said carriage, and leverage means for imposing a work effort on said tool through said leverage means to effect a cutting operation on the workpiece.

3. A tool in accordance with claim 2 wherein said cutting member comprises a blade which is pressed against the surface of the work piece to effect cutting thereof at preselected locations.

4. The tool in accordance with claim 1 wherein said cutting member comprises a rotary blade moved along said elongate member to effect a work operation on the work piece.

5. A tool construction in accordance with claim 1 wherein said carriage includes a way, operatively fitted on said elongate member, and antifriction bearing means between said way and said elongate member to facilitate longitudinal movement of the tool mounted on said carriage.

6. The tool in accordance with claim 1 including a transverse flange on said carriage including a plurality of apertures therein to form templates for drilling locations on the work piece.

7. The tool in accordance with claim 1 wherein said elongate member is of a lightweight metal composition having two slots wherein said adjustable gripping means are slidably supported thereon for said longitudinal movement.

* * * * *